United States Patent
Ju et al.

(10) Patent No.: US 12,061,802 B2
(45) Date of Patent: Aug. 13, 2024

(54) DYNAMIC MEMORY MANAGEMENT APPARATUS AND METHOD AND COMPUTER-READABLE STORAGE MEDIUM FOR THE SAME

(71) Applicant: ELECTRONICS AND TELECOMMUNICATIONS RESEARCH INSTITUTE, Daejeon (KR)

(72) Inventors: Hong-Il Ju, Daejeon (KR); Dong-Wook Kang, Daejeon (KR); Gae-Il An, Daejeon (KR); Bo-Heung Chung, Daejeon (KR); Byeong-Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 57 days.

(21) Appl. No.: 18/048,344

(22) Filed: Oct. 20, 2022

(65) Prior Publication Data
US 2023/0205431 A1 Jun. 29, 2023

(30) Foreign Application Priority Data
Dec. 23, 2021 (KR) .................. 10-2021-0185640

(51) Int. Cl.
*G06F 3/06* (2006.01)
*G06F 12/14* (2006.01)
*G06F 21/78* (2013.01)

(52) U.S. Cl.
CPC .......... *G06F 3/0622* (2013.01); *G06F 3/0631* (2013.01); *G06F 3/0673* (2013.01); *G06F 12/1458* (2013.01); *G06F 21/78* (2013.01)

(58) Field of Classification Search
CPC ........ G06F 21/52; G06F 21/78; G06F 3/0622; G06F 3/0631; G06F 3/0673; G06F 12/1458
USPC ....................................................... 711/163
See application file for complete search history.

(56) References Cited

U.S. PATENT DOCUMENTS

| | | | | |
|---|---|---|---|---|
| 10,656,801 | B1* | 5/2020 | Goodman | H04L 67/10 |
| 2007/0157003 | A1* | 7/2007 | Durham | G06F 21/79 |
| | | | | 711/E12.095 |
| 2008/0055617 | A1* | 3/2008 | Savagaonkar | G06F 12/1458 |
| | | | | 358/1.9 |
| 2012/0042133 | A1* | 2/2012 | Takeda | G06F 12/0804 |
| | | | | 711/143 |
| 2012/0278665 | A1* | 11/2012 | Serebryany | G06F 11/366 |
| | | | | 714/53 |

(Continued)

FOREIGN PATENT DOCUMENTS

| | | |
|---|---|---|
| KR | 10-2014-0077677 A | 6/2014 |
| KR | 10-2020-0111909 A | 10/2020 |
| KR | 10-2254159 B1 | 5/2021 |

*Primary Examiner* — Hashem Farrokh

(57) ABSTRACT

Disclosed herein are a dynamic memory management apparatus and method and a computer-readable storage medium for the same. The dynamic memory management method includes defining a shadow area mapped to a memory area, setting a coloring value in the shadow area, and permitting or denying access to the memory area based on the coloring value when accessing the memory area.

11 Claims, 15 Drawing Sheets

(56) References Cited

U.S. PATENT DOCUMENTS

2015/0331720 A1* 11/2015 Huetter ............... G06F 16/2228
718/104
2022/0058119 A1* 2/2022 Tsirkin ................ G06F 12/0646

* cited by examiner

210 — VALUE: 1010_1010(2) → DENY ACCESS (MEMORY ALLOCATION MANAGEMENT AREA)
230 — VALUE: 0101_0101(2) → DENY ACCESS (MEMORY ALLOCATION/ DEALLOCATION MANAGEMENT AREA)
250 — VALUE: 0000_0000(2) → DENY ACCESS (MEMORY DEALLOCATION AREA)
270 — VALUE: 1111_1111(2) → PERMIT ACCESS (MEMORY ALLOCATION AREA)

FIG. 5

DYNAMIC MEMORY MANAGEMENT APPARATUS AND METHOD AND COMPUTER-READABLE STORAGE MEDIUM FOR THE SAME

CROSS REFERENCE TO RELATED APPLICATION

This application claims the benefit of Korean Patent Application No. 10-2021-0185640, filed Dec. 23, 2021, which is hereby incorporated by reference in its entirety into this application.

BACKGROUND OF THE INVENTION

1. Technical Field

The present invention relates generally to a dynamic memory management method and apparatus for dynamic memory management.

2. Description of the Related Art

Generally, memory management is one of important elements in relation to performance of an embedded system in which a microprocessor is embedded, and is configured to perform an operation of allocating and deallocating a memory space in a system to each application so as to execute various applications in the microprocessor. An operation of allocating memory may be roughly classified into static memory allocation and dynamic memory allocation.

Static memory allocation refers to a scheme for fixing the size of memory in advance and allocating the size-fixed memory. In this case, an amount of memory larger than the maximum amount of memory used must be allocated, thus resulting in a waste of use of memory in a system. Accordingly, in an embedded system using memory having a limited size, dynamic memory allocation to applications is required.

Meanwhile, it is known that most attacks on a computing system use memory vulnerabilities such as Buffer Overflow (BOF) and Use-After-Free (UAF) vulnerabilities. As a representative one of the attacks, there is control flow hijacking. The control flow hijacking denotes an attack method which produces a control flow unintended by a developer by falsifying a function pointer, a return address, or the like, and executes an attacker's desired code.

Conventional UAF vulnerability detection technology includes red zone insertion technology and coloring technology. However, the conventional UAF vulnerability detection technology causes performance overhead due to an increase in the number of instructions and memory overhead due to allocation of a large-size memory area for vulnerability detection.

Further, various security mechanisms for solving security vulnerabilities are conventionally provided, but attackers make attacks by bypassing Double Free Bug (DFB) detection.

SUMMARY OF THE INVENTION

Accordingly, the present invention has been made keeping in mind the above problems occurring in the prior art, and an object of the present invention is to provide a dynamic memory management apparatus and method for preventing performance overhead and memory overhead from occurring when memory vulnerabilities are detected.

Another object of the present invention is to provide a dynamic memory management method and apparatus for improving the security strength of memory.

In accordance with an aspect of the present invention to accomplish the above objects, there is provided a dynamic memory management method, including defining a shadow area mapped to a memory area, setting a coloring value in the shadow area, and permitting or denying access to the memory area based on the coloring value when accessing the memory area.

Permitting or denying access to the memory area may include, when deallocation of a heap chunk from the memory area is completed by executing a free( ) function, denying access to a data area of the deallocated heap chunk based on the coloring value of the shadow area. Here, when the free( ) function is executed, permitting or denying access to the memory area may include storing information about the deallocated heap chunk in a memory management area (tcache_entry), and storing a forward pointer (fd) and a backward pointer (bk) in the data area of the deallocated heap chunk, thus completing deallocation of the heap chunk.

Permitting or denying access to the memory area may include when allocation of a heap chunk to the memory area is requested by executing a malloc( ) function, permitting access to a data area of an allocated heap chunk based on the coloring value of the shadow area.

The shadow area may be physically separated from the memory area.

The shadow area may be configured such that 16 bytes of the memory area are assigned as 1 byte to the shadow area.

An access authority setting area of the shadow area may be defined by two bits.

In accordance with another aspect of the present invention to accomplish the above objects, there is provided a dynamic memory management apparatus, including a shadow area definition unit for defining a shadow area mapped to a memory area, a coloring value setting unit for setting a coloring value in the shadow area, and a memory access determination unit for permitting or denying access to the memory area based on the coloring value when accessing the memory area.

The memory access determination unit may be configured to, when deallocation of a heap chunk from the memory area is completed by executing a free( ) function, deny access to a data area of the deallocated heap chunk based on the coloring value of the shadow area.

The memory access determination unit may be configured to, when the free( ) function is executed, store information about the deallocated heap chunk in a memory management area (tcache_entry), and store a forward pointer (fd) and a backward pointer (bk) in the data area of the deallocated heap chunk, thus completing deallocation of the heap chunk.

The memory access determination unit may be configured to, when allocation of a heap chunk to the memory area is requested by executing a malloc( ) function, permit access to a data area of an allocated heap chunk based on the coloring value of the shadow area.

The shadow area may be physically separated from the memory area.

The shadow area may be configured such that 16 bytes of the memory area are assigned as 1 byte to the shadow area.

An access authority setting area of the shadow area may be defined by two bits.

In accordance with a further aspect of the present invention to accomplish the above objects, there is provided a computer-readable storage medium storing a computer program, the computer program including instructions allowing a processor to perform operations when executed by the processor, the operations including defining a shadow area mapped to a memory area, setting a coloring value in the shadow area, and permitting or denying access to the memory area based on the coloring value when accessing the memory area.

BRIEF DESCRIPTION OF THE DRAWINGS

The above and other objects, features and advantages of the present invention will be more clearly understood from the following detailed description taken in conjunction with the accompanying drawings, in which:

FIG. 5 is a diagram illustrating the definition of access authority depending on the coloring value of a shadow area;

DESCRIPTION OF THE PREFERRED EMBODIMENTS

Figure 1:
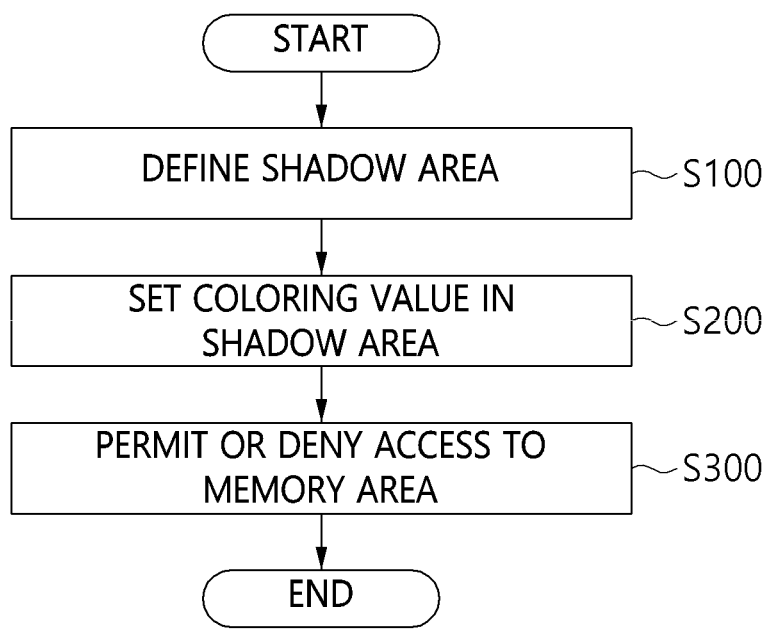
FIG. 1 is a flowchart illustrating a dynamic memory management method according to an embodiment of the present invention.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Embodiments of the present invention will now be described in detail with reference to the accompanying drawings. Like numerals refer to like elements throughout, and overlapping descriptions will be omitted.

FIG. 1 is a flowchart illustrating a dynamic memory management method according to an embodiment of the present invention.

Referring to FIG. 1, the dynamic memory management method according to the embodiment of the present invention may include defining a shadow area mapped to a memory area at step S100, setting a coloring value in the shadow area at step S200, and permitting or denying access to the memory area based on the coloring value at step S300. Here, the dynamic memory management method may be performed by the dynamic memory management apparatus 300 of FIG. 14, which will be described later.

Figure 2:
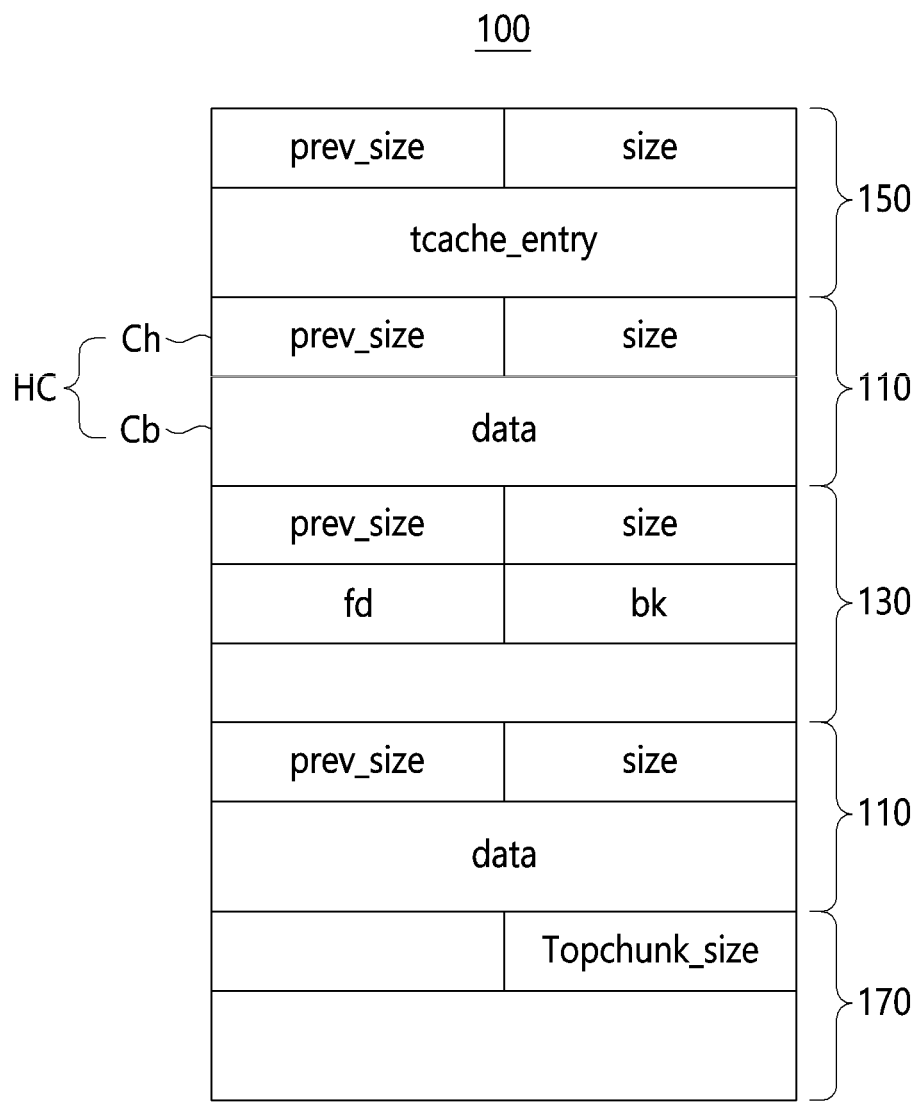
FIG. 2 is a diagram illustrating a memory structure used for dynamic memory allocation and deallocation according to an embodiment of the present invention.

FIG. 2 is a diagram illustrating a memory structure used for dynamic memory allocation and deallocation according to an embodiment of the present invention.

Referring to FIG. 2, a memory area 100 may include a memory allocation area 110 having a heap chunk structure, which is generated when memory is dynamically allocated, a memory deallocation area 130 having a heap chunk structure, which is generated when the memory is dynamically deallocated, and a memory management area (tcache_entry) 150 having a heap chunk structure, which manages deallocation/reallocation of the memory. Here, reference numeral 170 may refer to the remaining area other than the memory allocation area, the memory deallocation area, and the memory management area.

'prev_size' may be a space in which size information of a deallocated (free) previous heap chunk HC is stored when a previous heap chunk HC is deallocated. 'size' may be a space in which size information of an allocated current heap chunk HC is stored. 'forward pointer (fd)' may denote the address of a subsequent heap chunk HC present in the same bin when the memory is deallocated. 'backward pointer (bk)' may denote the address of a previous heap chunk HC in the same bin. Furthermore, the heap chunk HC may be composed of a body Cb and a header Ch.

The operation of the memory structure will be described in detail below. When a desired size is requested for dynamic memory allocation using a malloc( ) function, a pointer address for dynamic memory allocation is returned, and the returned address is the start address of a chunk body other than a chunk header.

When dynamic memory deallocation is requested using a free ( ) function after dynamic memory allocation, a process of storing the pointers fd and bk in a data area 'data', and registering the deallocated memory area as an reallocable memory area in the memory management area 150, which is located in the uppermost portion of the memory area 100 may be performed.

The memory management area 150 may search for a reallocable area and reallocate the found reallocable area.

At step S100, the dynamic memory management apparatus 300 may define the shadow area mapped to the memory area 100. The dynamic memory management apparatus 300 may define the shadow area to be physically separated from the memory area 100.

Figure 3:
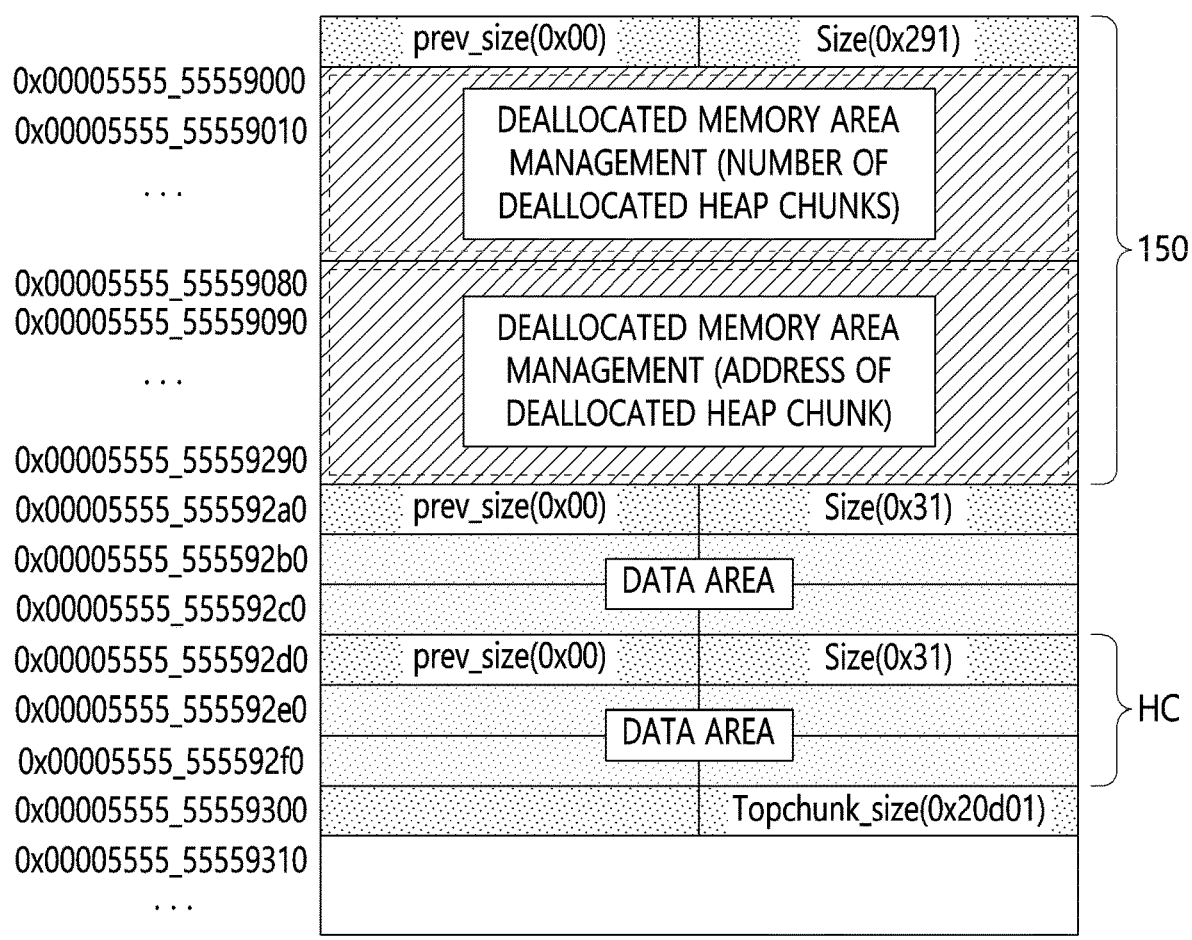
FIG. 3 is a diagram illustrating an actual memory area of memory to which a heap chunk is allocated according to an embodiment of the present invention.
Figure 4:
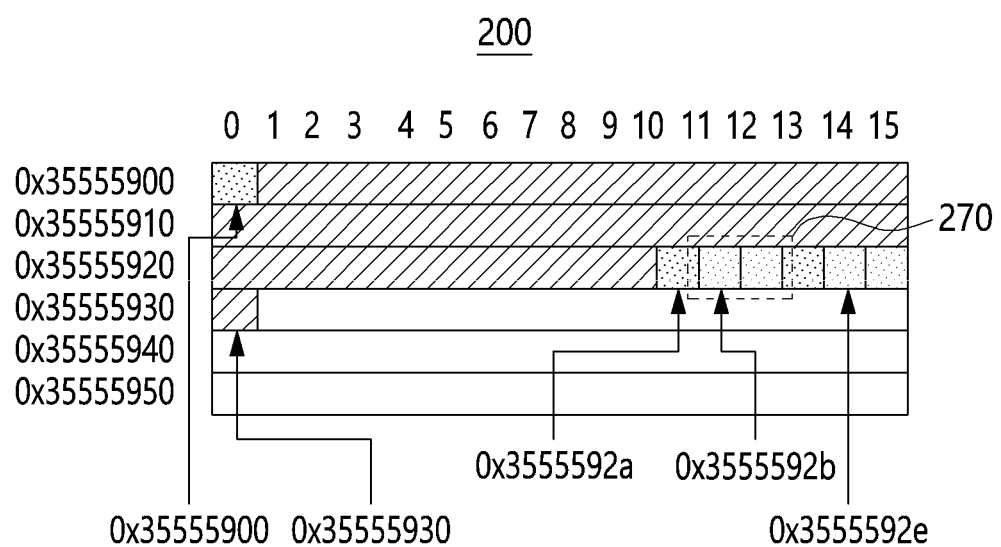
FIG. 4 is a diagram illustrating access authority values in a shadow area mapped to the memory area of FIG. 3.

FIG. 3 is a diagram illustrating an actual memory area of memory to which a heap chunk is allocated according to an embodiment of the present invention, FIG. 4 is a diagram illustrating access authority values in a shadow area mapped to the memory area of FIG. 3, and FIG. 5 is a diagram illustrating the definition of access authority depending on the coloring value of a shadow area.

As illustrated in FIG. 3, when two malloc( ) functions are executed for dynamic allocation of memory having the same size of (0x20), a dynamic memory allocation request may be provided to the memory management area 150, and the memory management area 150 may search for a reallocable memory area, and thus two heap chunks HC may be generated. Here, 'size' may be '0x31' including the sizes of the body Cb and the header Ch of the allocated heap chunk HC.

As illustrated in FIG. 4, the shadow area 200 may be defined as '0x3000_0000' to '0x3fff_ffff'. Mapping between the memory area 100 and the shadow area 200 may be realized by performing a '>>(left shift) 4 bit' shift operation on lower bytes of the actual memory address and adding '0x3000_0000', which is the base address of the shadow area 200, to the result of the shift operation. This means that allocation of heap chunks is performed in units of 16 bytes in a 64-bit machine, and thus a lower 4-bit value of the address is meaningless.

Therefore, the dynamic memory management apparatus 300 may allocate 16 bytes of the memory area as 1 byte of the shadow area, and may define the value of access authority as the value of a 2-bit unit. The values of the shadow area 200 may be defined as four 2-bit values, for example, '00(2)', '01(2)', '10(2)', and '11(2)'.

The dynamic memory management apparatus 300 may set a coloring value in the shadow area 200 to acquire the authority to access the memory at step S200. Further, the dynamic memory management apparatus 300 may permit or deny access to the memory area based on the coloring value at step S300.

As illustrated in FIG. 5, the shadow area 200 may include a first area 210 in which a coloring value of '1010_1010(2)' is set, a second area 230 in which a coloring value of '0101_0101(2)' is set, a third area 250 in which a coloring value of '0000_0000(2)' is set, and a fourth area 270 in which a coloring value of '1111_1111(2)' is set.

Referring back to FIGS. 3 and 4, the first area 210 of the shadow area 200 may include the memory management area 150 and correspond to the header of a heap chunk HC, and access to the first area 210 may be denied after allocation of the heap chunk HC. The second area 230 of the shadow area 200 may be a management area for a deallocated heap chunk HC and correspond to a heap chunk deallocation/allocation area, and access to the second area 230 may be denied after allocation and deallocation of the heap chunk HC. The third area 250 of the shadow area 200 may correspond to a data area of a deallocated heap chunk CH after the heap chunk HC is deallocated, and access to the third area 250 may be denied after the heap chunk HC is deallocated. The fourth area 270 of the shadow area 200 may correspond to a data area of an allocated heap chunk CH after the heap chunk HC is allocated, and access to the fourth area 270 is permitted after the heap chunk HC is allocated.

Therefore, the shadow area 200 may be set such that a user is capable of accessing only the data area of the heap chunk HC allocated through two malloc functions, thus blocking access to addresses falling out of the data area.

Figure 6:
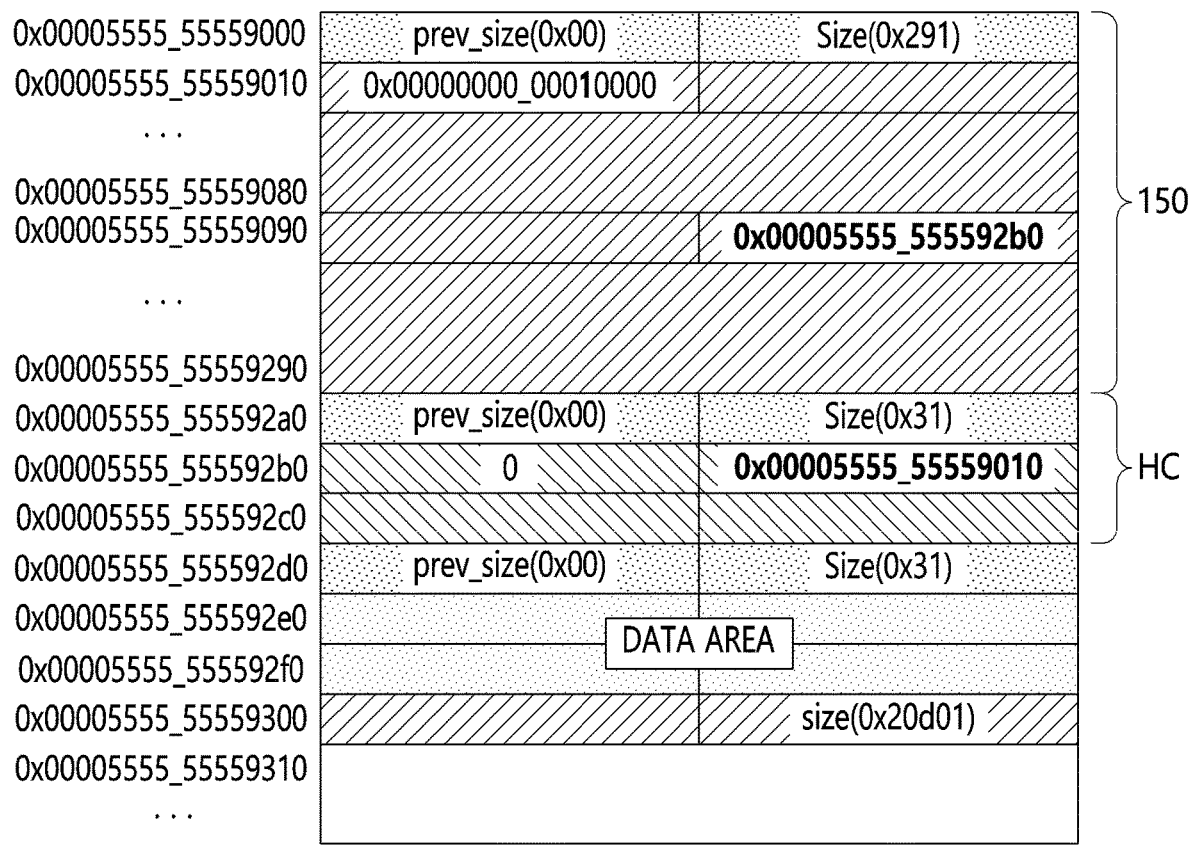
FIG. 6 is a diagram illustrating an actual memory area of memory to which a heap chunk is allocated according to another embodiment of the present invention.
Figure 7:
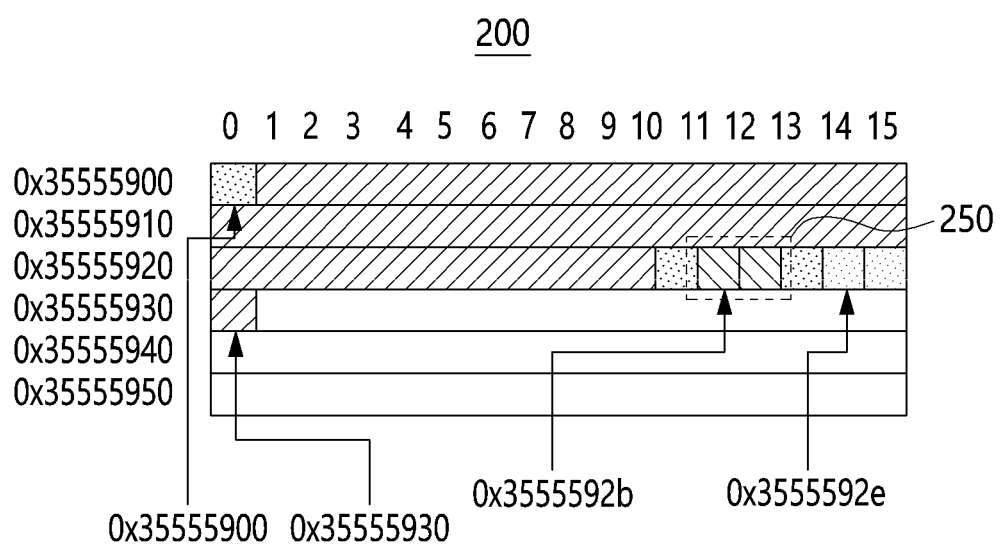
FIG. 7 is a diagram illustrating access authority values in a shadow area mapped to the memory area of FIG. 6.

FIG. 6 is a diagram illustrating an actual memory area of memory to which a heap chunk is allocated according to another embodiment of the present invention, and FIG. 7 is a diagram illustrating access authority values in a shadow area mapped to the memory area of FIG. 6.

As illustrated in FIG. 6, when two malloc ( ) functions are executed for dynamic allocation of memory having the same size of (0x20), two heap chunks HC may be generated in the memory area 100.

Thereafter, when a free( ) function is executed, information about a deallocated (free) heap chunk HC may be stored in the memory management area 150, and pointers fd and bk may be stored in the data area of the deallocated heap chunk HC.

As illustrated in FIG. 7, when deallocation of the heap chunk HC from the memory area 100 is completed, a coloring value of 0000_0000(2) corresponding to the data area of the deallocated heap chunk HC may be set in the third area 250 of the shadow area 200 mapped to the memory area 100.

Therefore, after the heap chunk HC is deallocated by executing the free( ) function, access to the data area of the deallocated heap chunk HC may be denied.

Figure 8:
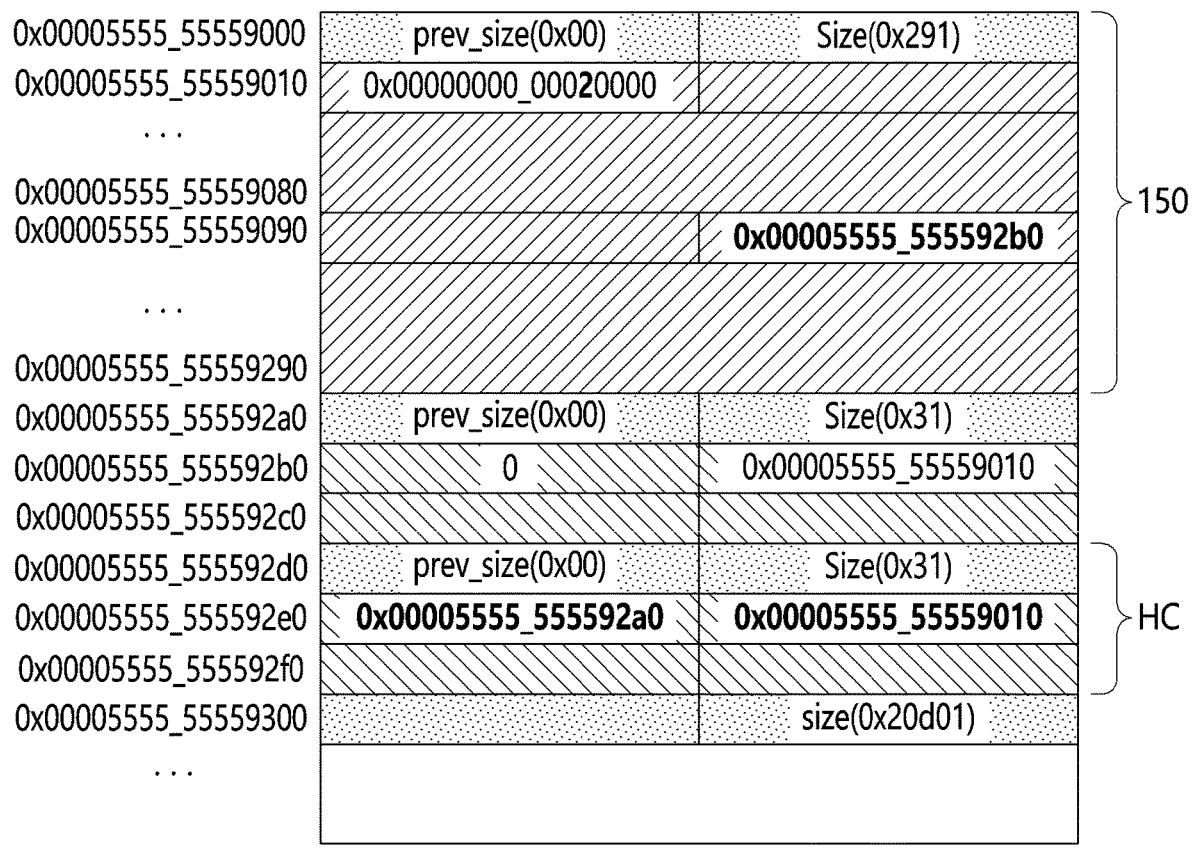
FIG. 8 is a diagram illustrating an actual memory area of memory from which a heap chunk is deallocated according to an embodiment of the present invention.
Figure 9:
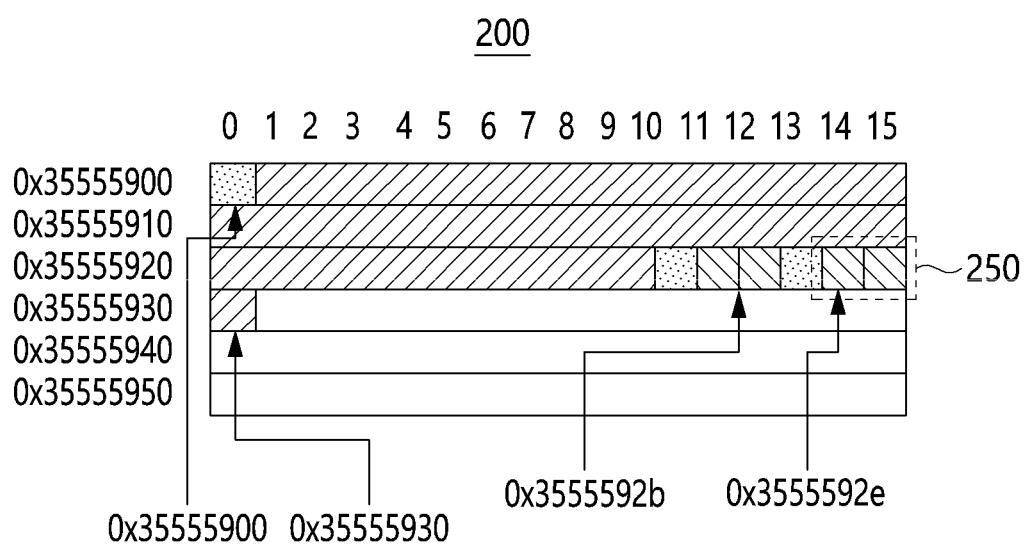
FIG. 9 is a diagram illustrating access authority values in a shadow area mapped to the memory area of FIG. 8.

FIG. 8 is a diagram illustrating an actual memory area of memory from which a heap chunk is deallocated according to an embodiment of the present invention, and FIG. 9 is a diagram illustrating access authority values in a shadow area mapped to the memory area of FIG. 8.

As illustrated in FIG. 8, when a second free ( ) function is executed after execution of a first free( ) function, information about a deallocated (free) heap chunk HC may be stored in the memory management area 150, and pointers fd and bk may be stored in the data area of the deallocated heap chunk HC.

As illustrated in FIG. 9, when deallocation of the heap chunk HC from the memory area 100 is completed, a coloring value of 0000_0000(2) corresponding to the data area of the deallocated heap chunk HC may be set in the third area 250 of the shadow area 200 mapped to the memory area 100.

Therefore, after the heap chunk HC is deallocated by executing the free( ) function, access to the data area of the deallocated heap chunk HC may be denied.

Figure 10:
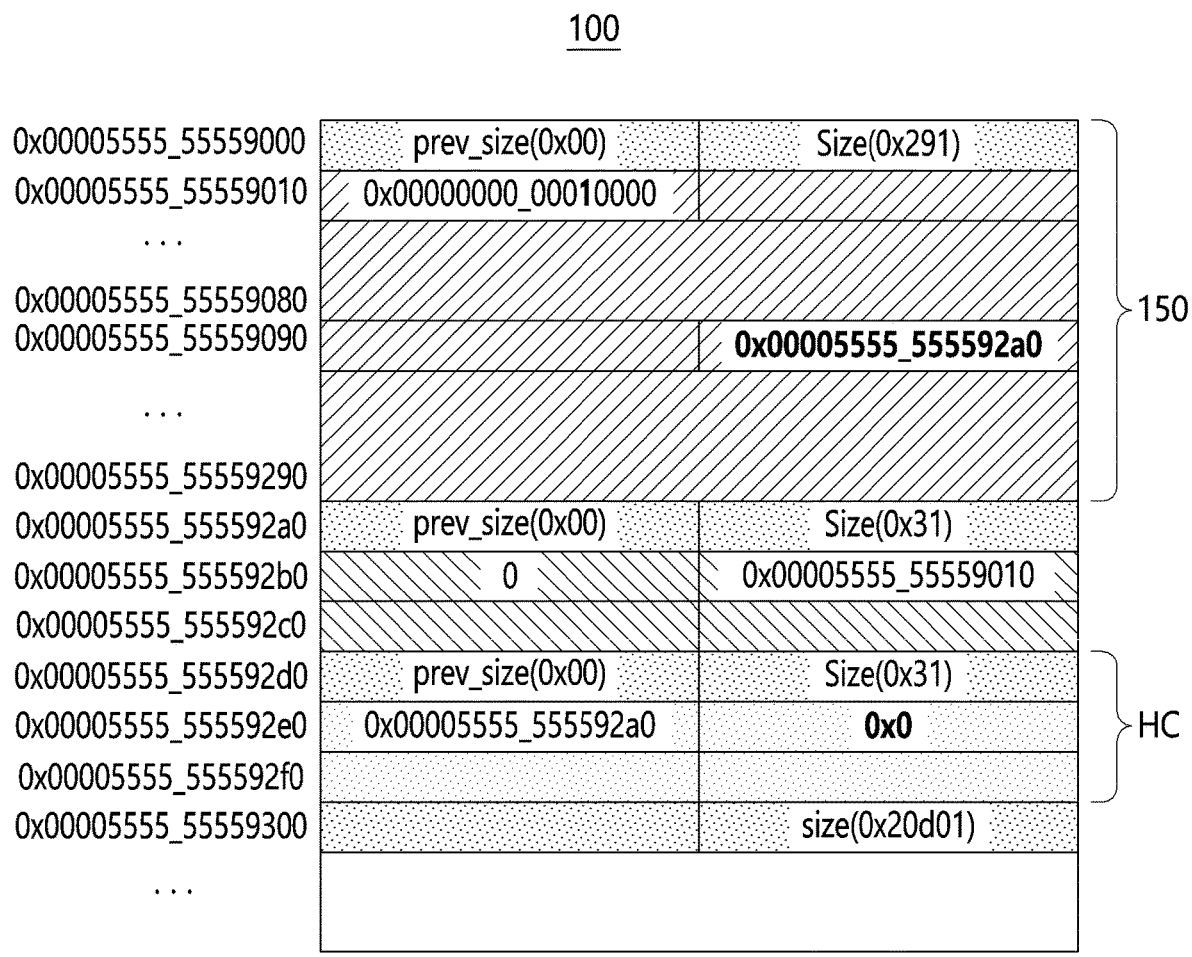
FIG. 10 is a diagram illustrating an actual memory area of memory from which a heap chunk is deallocated according to another embodiment of the present invention.
Figure 11:
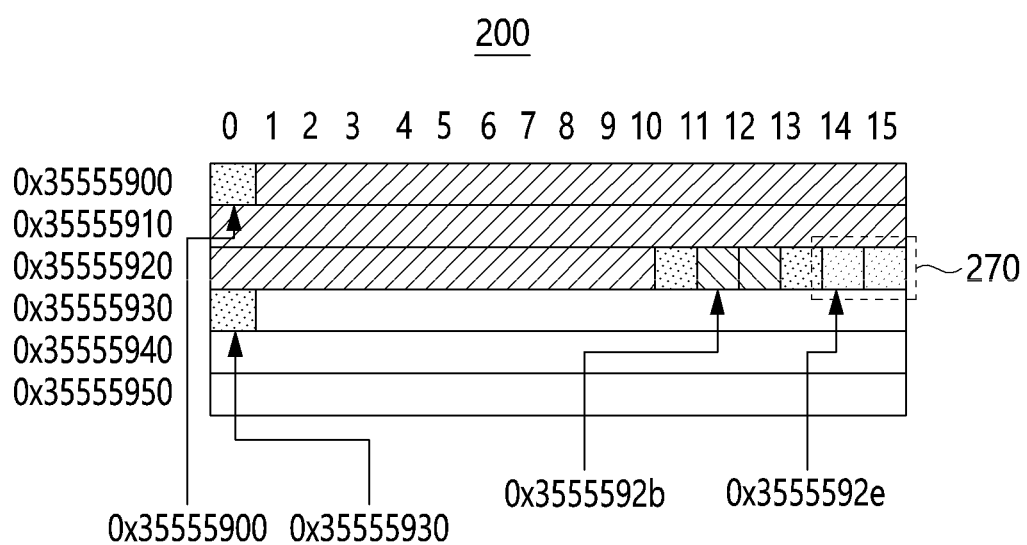
FIG. 11 is a diagram illustrating access authority values in a shadow area mapped to the memory area of FIG. 10.

FIG. 10 is a diagram illustrating an actual memory area of memory from which a heap chunk is deallocated according to another embodiment of the present invention, and FIG. 11 is a diagram illustrating access authority values in a shadow area mapped to the memory area of FIG. 10.

As illustrated in FIG. 10, when allocation of a heap chunk HC having the same size is requested again after a heap chunk HC is deallocated using a second free( ) function, the memory management area 150 may search for a deallocated heap chunk that is allocable. When a deallocated heap chunk HC is present, the memory management area 150 may perform reallocation. Here, when the number of reallocable heap chunks HC may be reduced to '1', and the address of the reallocable heap chunk HC may be changed to '0x00005555_555592a0'.

As illustrated in FIG. 11, when reallocation of the requested heap chunk HC to the memory area 100 is completed, a coloring value of '1111_1111(2)', which is a value enabling access to the data area of the reallocated heap chunk HC, may be set in the fourth area 270 of the shadow area 200 mapped to the memory area 100.

Therefore, when the heap chunk HC is reallocated by executing a malloc( ) function, access to the data area of the reallocated heap chunk HC may be permitted again.

Figure 12:
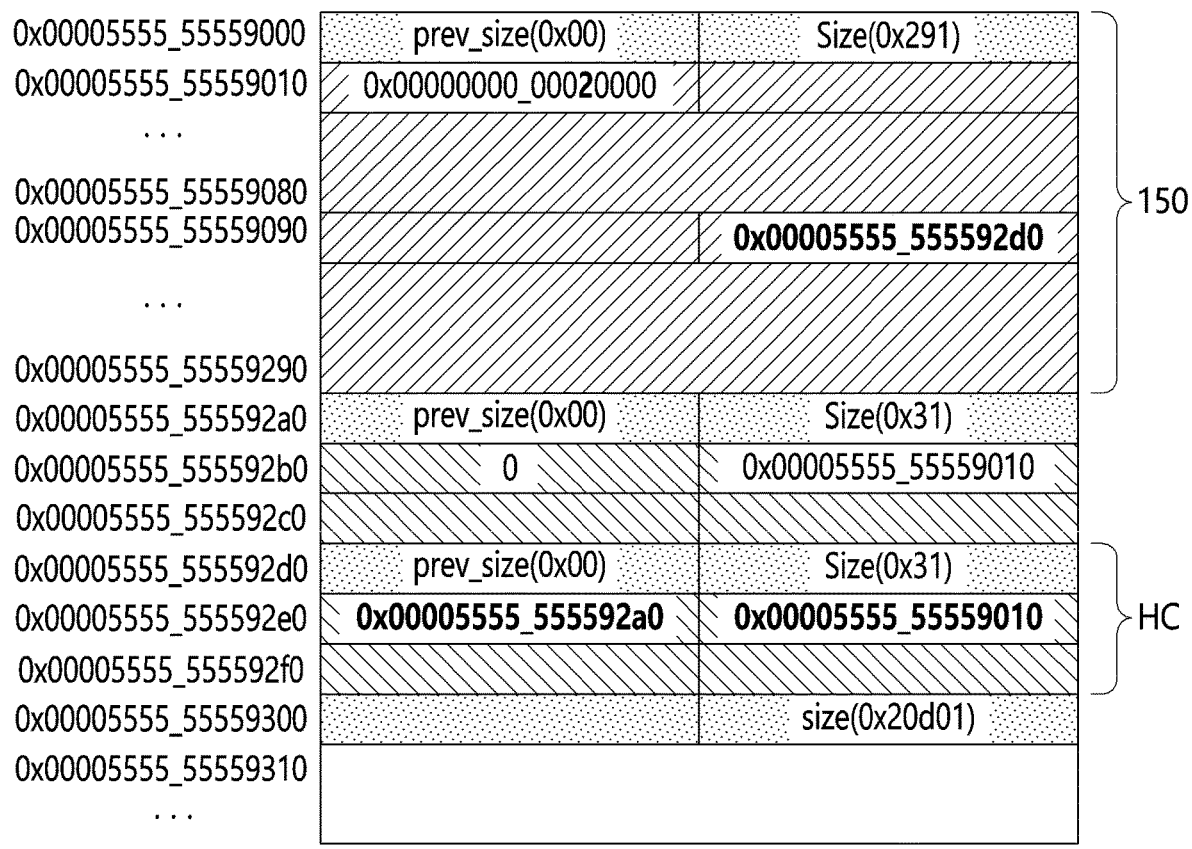
FIG. 12 is a diagram illustrating an actual memory area from which a heap chunk is deallocated after the heap chunk is reallocated to memory.
Figure 13:
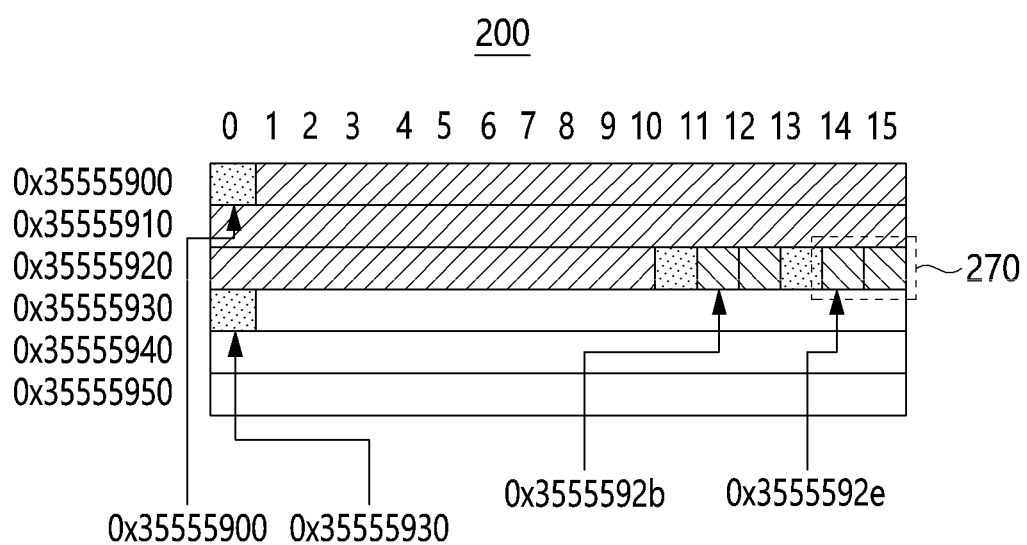
FIG. 13 is a diagram illustrating access authority values in a shadow area mapped to the memory area of FIG. 12.

FIG. 12 is a diagram illustrating an actual memory area from which a heap chunk is deallocated after the heap chunk is reallocated to memory, and FIG. 13 is a diagram illustrating access authority values in a shadow area mapped to the memory area of FIG. 12.

As illustrated in FIG. 12, when a free ( ) function is executed after a heap chunk HC is reallocated using a malloc ( ) function, information about a deallocated (free) heap chunk HC may be stored in the memory management area 150, and pointers fd and bk may be stored in the data area of the heap chunk HC. Here, the deallocated heap chunk HC may be added to the memory management area 150, and thus the number of reallocable heap chunks HC may increase to '2', and the address of the reallocable heap chunk HC may change to '0x00005555_555592d0'.

As illustrated in FIG. 13, when deallocation of the heap chunk HC from the memory area 100 is completed, a coloring value of 0000_0000(2), which is a value for denying access to the data area of the deallocated heap chunk HC, may be set in the fourth area 270 of the shadow area 200.

Therefore, after the heap chunk HC is deallocated by executing the free( ) function, access to the data area of the deallocated heap chunk HC may be denied again.

Figure 14:
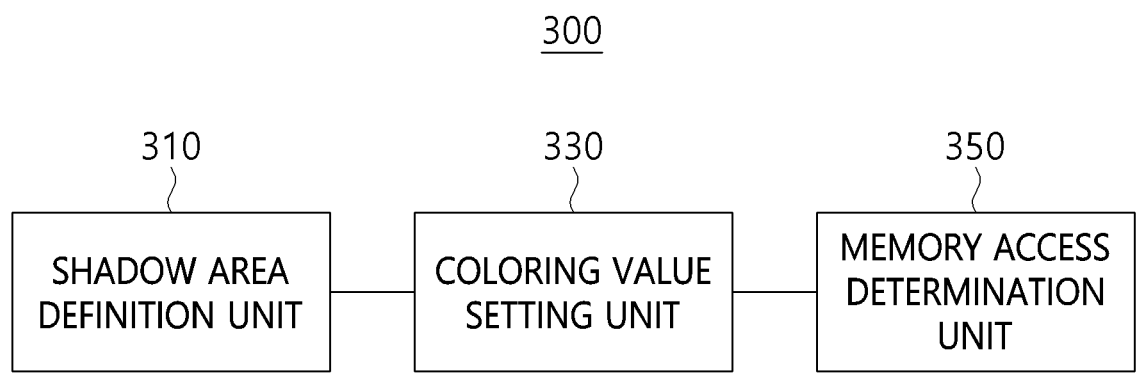
FIG. 14 is a block diagram illustrating the configuration of a dynamic memory management apparatus according to an embodiment of the present invention.

FIG. 14 is a block diagram illustrating the configuration of a dynamic memory management apparatus according to an embodiment of the present invention.

Referring to FIG. 14, the dynamic memory management apparatus 300 according to an embodiment may include a shadow area definition unit 310, a coloring value setting unit 330, and a memory access determination unit 350.

The shadow area definition unit 310 may define a shadow area mapped to a memory area. The coloring value setting unit 330 may set a coloring value for assigning access authority in the shadow area. The memory access determination unit 350 may permit or deny access to the memory area based on the coloring value.

The shadow area may be physically separated from the memory area. 16 bytes of the memory area may be allocated as 1 byte to the shadow area. An access authority setting area in the shadow area may be defined by 2 bits.

Because the operation of the shadow area performed in dynamic memory allocation and deallocation has been described above with reference to FIGS. 3 to 13, a detailed description thereof will be omitted.

The dynamic memory allocation apparatus according to an embodiment may be implemented in a computer system 1000 such as a computer-readable storage medium.

Figure 15:
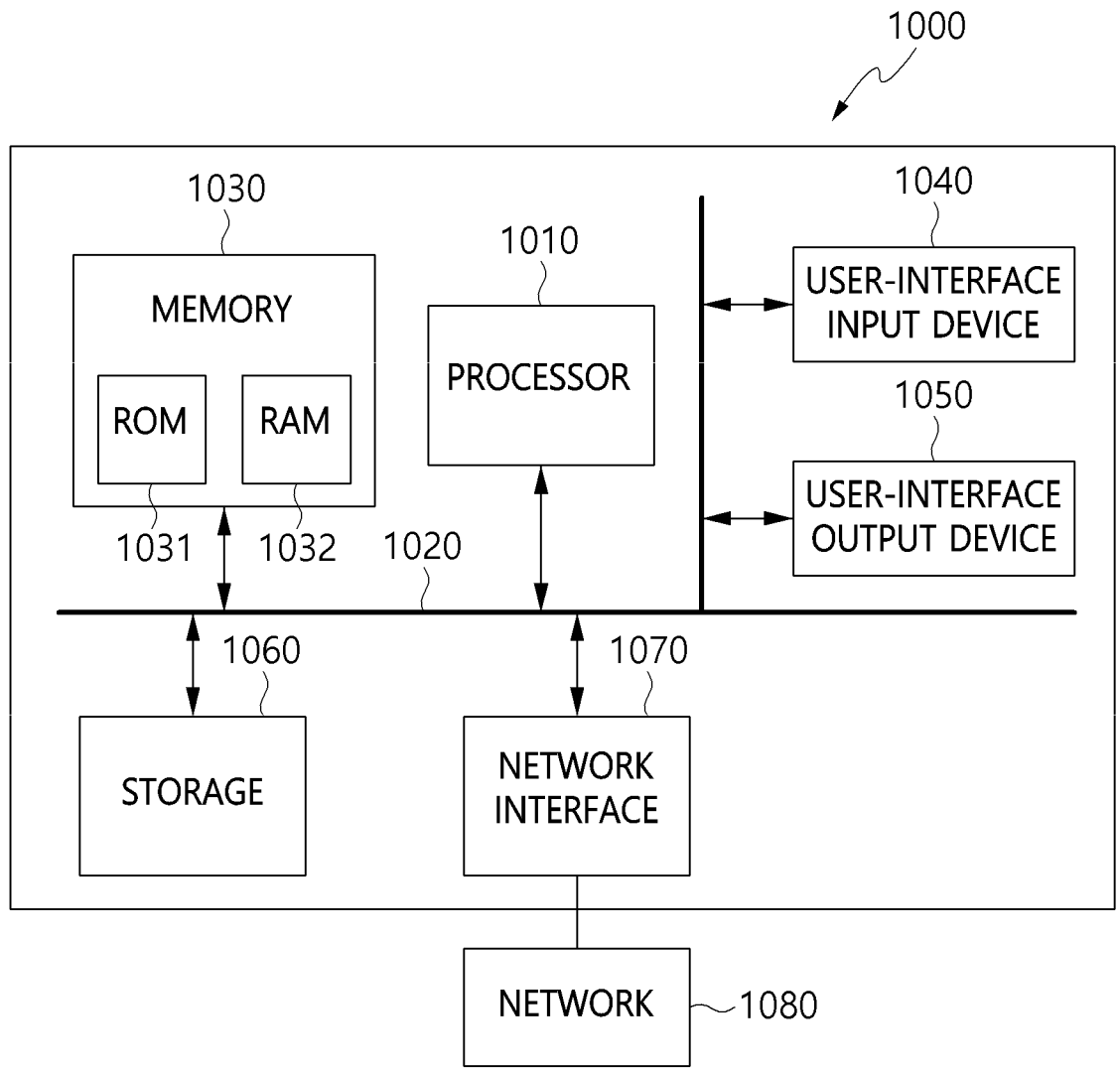
FIG. 15 is a block diagram illustrating the configuration of a computer system according to an embodiment of the present invention.

FIG. 15 is a block diagram illustrating the configuration of a computer system according to an embodiment of the present invention.

Referring to FIG. 15, the computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium or an information delivery medium, or a combination thereof. For example, the memory 1030 may include Read-Only Memory (ROM) 1031 or Random Access Memory (RAM) 1032.

That is, the computer-readable storage medium for storing a computer program may include instructions that allow the processor to perform a method including an operation of defining a shadow area mapped to a memory area, an operation of setting a coloring value in the shadow area, and an operation of permitting or denying access to the memory area based on the coloring value.

Further, in accordance with an embodiment, a computer program stored in a computer-readable storage medium may include instructions that allow the processor to perform a method including an operation of defining a shadow area mapped to a memory area, an operation of setting a coloring value in the shadow area, and an operation of permitting or denying access to the memory area based on the coloring value.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

According to the present invention, after memory is dynamically allocated and the allocated memory area is deallocated, access to a data area of the deallocated memory may be denied, and thus attacks using memory vulnerabilities, such as UAF and DFB, may be effectively prevented.

Further, the present invention may deny user access to a metadata area in which memory is dynamically allocated and a data area is managed, and may enable the size of an allocated heap chunk or the total size of a heap chunk area to be changed only by a dynamic memory manager, thus enabling dynamic memory management to be more securely performed.

Furthermore, the present invention may define a shadow area mapped to a memory area and determine whether permit or deny access to memory through the shadow area, thus improving security strength.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. A dynamic memory management method, comprising:
defining a shadow area mapped to a memory area;
setting a coloring value in the shadow area; and
permitting or denying access to the memory area based on the coloring value when accessing the memory area,
wherein permitting or denying the access to the memory area comprises:
when deallocation of a heap chunk from the memory area is completed by executing a free( ) function, denying access to a data area of the deallocated heap chunk based on the coloring value of the shadow area;
when the free( ) function is executed, storing information about the deallocated heap chunk in a memory management area (tcache_entry); and
storing a forward pointer (fd) and a backward pointer (bk) in the data area of the deallocated heap chunk, thus completing the deallocation of the heap chunk.

2. The dynamic memory management method of claim 1, wherein permitting or denying the access to the memory area further comprises:
when allocation of a heap chunk to the memory area is requested by executing a malloc( ) function, permitting access to a data area of an allocated heap chunk based on the coloring value of the shadow area.

3. The dynamic memory management method of claim 1, wherein the shadow area is physically separated from the memory area.

4. The dynamic memory management method of claim 1, wherein the shadow area is configured such that 16 bytes of the memory area are assigned as 1 byte to the shadow area.

5. The dynamic memory management method of claim 1, wherein an access authority setting area of the shadow area is defined by two bits.

6. A dynamic memory management apparatus, comprising:
a shadow area definition unit for defining a shadow area mapped to a memory area;
a coloring value setting unit for setting a coloring value in the shadow area; and
a memory access determination unit for permitting or denying access to the memory area based on the coloring value when accessing the memory area,
wherein the memory access determination unit is configured to:
when deallocation of a heap chunk from the memory area is completed by executing a free( ) function, deny access to a data area of the deallocated heap chunk based on the coloring value of the shadow area;
when the free( ) function is executed, store information about the deallocated heap chunk in a memory management area (tcache_entry); and
store a forward pointer (fd) and a backward pointer (bk) in the data area of the deallocated heap chunk, thus completing deallocation of the heap chunk.

7. The dynamic memory management apparatus of claim 6, wherein the memory access determination unit is further configured to, when allocation of a heap chunk to the memory area is requested by executing a malloc( ) function, permit access to a data area of an allocated heap chunk based on the coloring value of the shadow area.

8. The dynamic memory management apparatus of claim 6, wherein the shadow area is physically separated from the memory area.

9. The dynamic memory management apparatus of claim 6, wherein the shadow area is configured such that 16 bytes of the memory area are assigned as 1 byte to the shadow area.

10. The dynamic memory management apparatus of claim 6, wherein an access authority setting area of the shadow area is defined by two bits.

11. A computer-readable storage medium storing a computer program, the computer program comprising instructions allowing a processor to perform operations when executed by the processor, the operations comprising:
defining a shadow area mapped to a memory area;
setting a coloring value in the shadow area; and
permitting or denying access to the memory area based on the coloring value when accessing the memory area,
wherein permitting or denying the access to the memory area comprises:
when deallocation of a heap chunk from the memory area is completed by executing a free( ) function, denying access to a data area of the deallocated heap chunk based on the coloring value of the shadow area;
when the free( ) function is executed, storing information about the deallocated heap chunk in a memory management area (tcache_entry); and
storing a forward pointer (fd) and a backward pointer (bk) in the data area of the deallocated heap chunk, thus completing deallocation of the heap chunk.

* * * * *